May 13, 1947.  H. K. LEONARD  2,420,639
CHART FOR WEIGHING SCALES
Filed Jan. 19, 1943  2 Sheets-Sheet 1
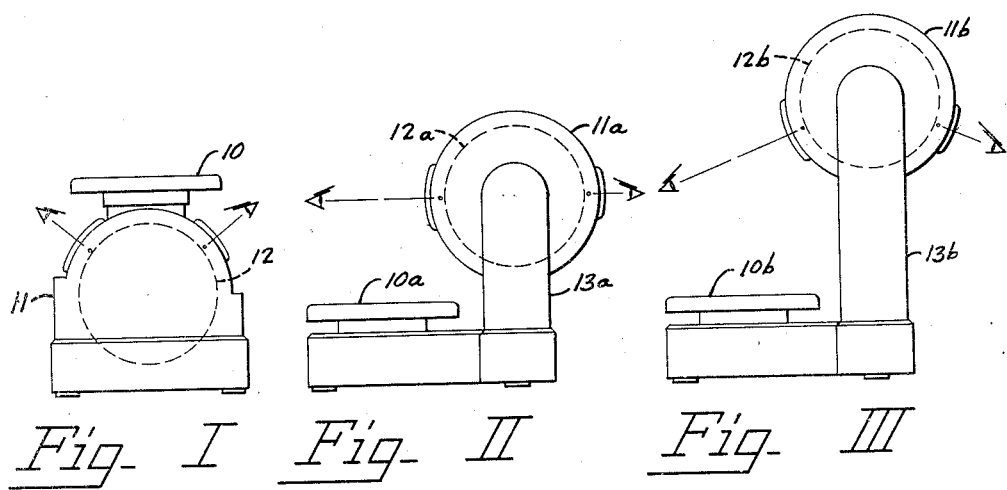
Fig. I  Fig. II  Fig. III
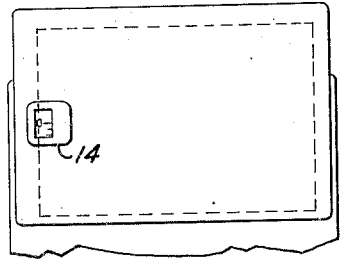
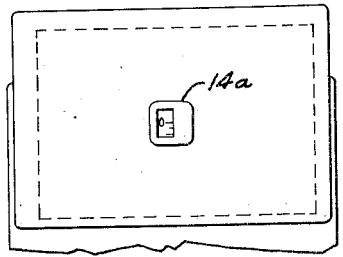
Fig. IV  Fig. V
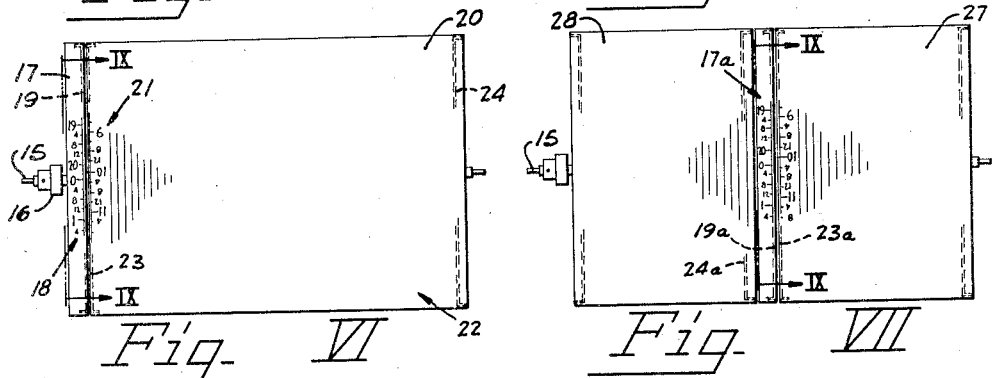
Fig. VI  Fig. VII
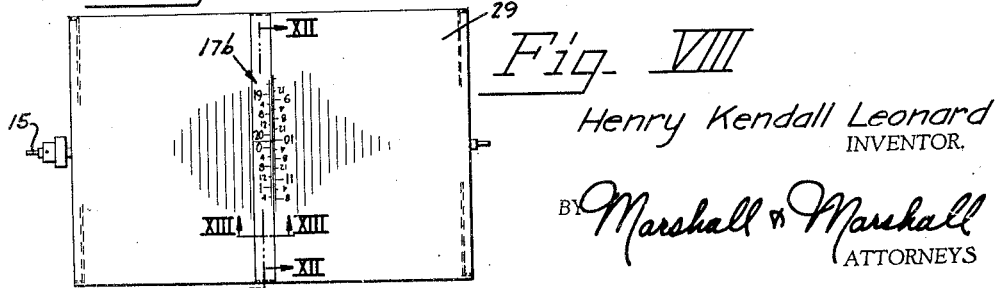
Fig. VIII
Henry Kendall Leonard
INVENTOR.
BY Marshall & Marshall
ATTORNEYS May 13, 1947. H. K. LEONARD 2,420,639
CHART FOR WEIGHING SCALES
Filed Jan. 19, 1943 2 Sheets-Sheet 2
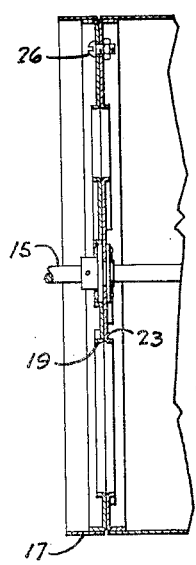
Fig. X
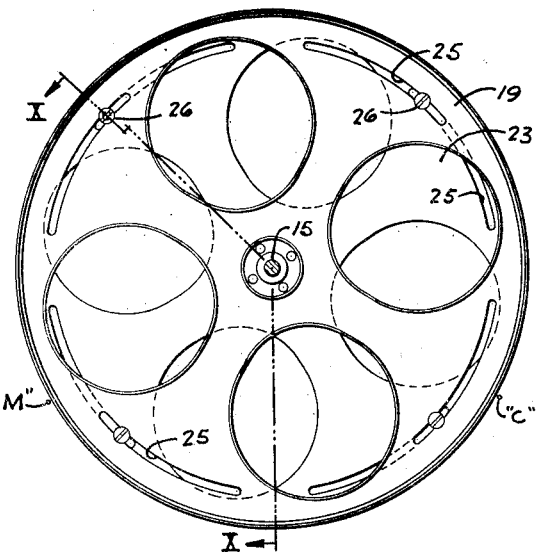
Fig. XI
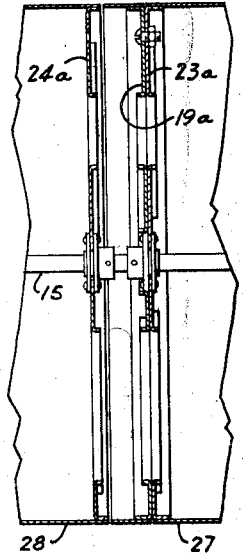
Fig. XII
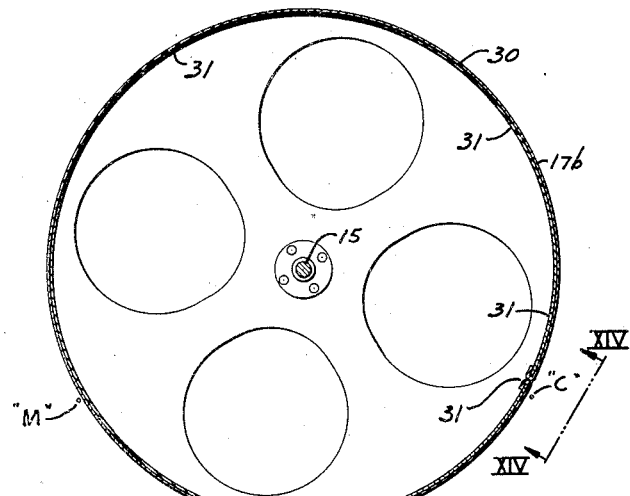
Fig. XIII
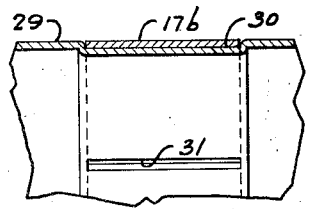
Fig. XIII
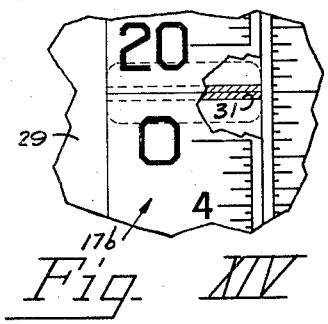
Fig. XIV
Henry Kendall Leonard
INVENTOR.
BY Marshall & Marshall
ATTORNEYS Patented May 13, 1947

2,420,639

UNITED STATES PATENT OFFICE 2,420,639

CHART FOR WEIGHING SCALES

Henry Kendall Leonard, Albany, N. Y., assignor to Toledo Scale Company, Toledo, Ohio, a corporation of New Jersey Application January 19, 1943, Serial No. 472,827

3 Claims. (Cl. 116—129)

This invention relates to charts for weighing scales and more particularly to the provision of a standard chart assemblage for use in various types and styles of so-called "cylinder" weighing scales.

In this type of weighing scale the chart is made up of a cylindrically shaped sheet of indicia bearing material and is rotated on its longitudinal axis in response to the forces exerted by loads weighed on the scale. Different styles of cylinder scales have been constructed for use on different height counters; for example, a "box" scale may be employed on a low or medium height counter, a "short column" scale may be employed on a medium height counter and a "tall column" scale may be employed on a low or medium height counter. In addition to the general styles mentioned, it may be desirable in some instances to vary the direction from which the scale can be read in order to accommodate it to the height of a counter or floor level in the store where it is used.

Because weight indications must be provided both for the merchant using the scale and for the customer, two series of weight indicia must be provided, one of which is visible from each side of the weighing scale. This further increases the variations in charts which may have to be constructed because it may be that the reading level on one side of the scale is different from that on the other side of the scale.

It has been necessary for weighing scale manufacturers to construct charts for each of the possible variations in style of the cylinder scales which they sold. This has required not only extra manufacturing facilities but also has increased the storage and stock keeping difficulties. Coupled with these problems has been the necessity of designing charts to meet each condition.

It is an object of this invention to provide a chart assemblage for a cylinder scale which can be modified at will for use in different styles and types of cylinder scales.

More specific objects and advantages are apparent from the description, in which reference is had to the accompanying drawings illustrating preferred forms of chart assemblage embodying the invention.

In the drawings:

Figs. I, II and III are simplified end elevations of three different types of cylinder scales, showing the sighting lines for each, which may advantageously be equipped with charts employing the invention.

Figs. IV and V are fragmentary views in elevation of two different locations for the customer's weight indication.

Fig. VI is a view in elevation on an enlarged scale of a chart adapted to be employed with the customer's indication illustrated in Fig. IV.

Figs. VII and VIII are views in elevation of two further modifications of the invention being adapted to be employed with the customer's indication illustrated in Fig. V.

Fig. IX is a greatly enlarged vertical sectional view illustrating one form of chart construction and taken from the position indicated by the line IX—IX in Fig. VI and the line IX—IX in Fig. VII.

Fig. X is a vertical sectional view taken substantially on the line X—X of Fig. IX of the modification of the invention shown in Fig. VI.

Fig. XI is a view similar to Fig. X but of the modification of the invention shown in Fig. VII.

Fig. XII is a vertical sectional view taken substantially on the line XII—XII of Fig. VIII.

Fig. XIII is a still further enlarged fragmentary sectional view taken substantially on the line XIII—XIII of Fig. VIII.

Fig. XIV is a fragmentary view in elevation taken from the position indicated by the line XIV—XIV in Fig. XII.

These specific drawings and the specific description that follows merely disclose and illustrate the invention and are not intended to impose limitations upon the claims.

The weighing scale illustrated in Fig. I is of the "box" type being equipped with a commodity platter 10 which is located above its housing 11 and having a chart 12 located in the interior of the housing 11. This scale is shown with its indicating means located in position to permit the chart to be viewed from an elevation above its axis and the general level of the scale.

The weighing scale illustrated in Fig. II is of the "short column" type being equipped with a commodity platter 10a and a chart housing 11a enclosing a chart 12a and mounted atop a short columnar housing 13a. This scale is provided with indications on opposite sides of its housing which are designed for reading from a point substantially on the plane of the chart axis.

The scale illustrated in Fig. III is of the so called "high column" type having a commodity platter 10b and a chart housing 11b, enclosing a cylindrical chart 12b and mounted on top of a high columnar housing 13b. This scale is shown as designed to be read from a level below the level of the chart axis.

The scales shown in these three figures merely illustrate three of the many styles and types of cylinder scales with which charts embodying the invention are adapted to be employed. Further variations in the directions from which the indications can be read easily can be provided through the use of interchangeable chart housing covers having their reading apertures in the desired positions.

Fig. IV illustrates one type of customer weight indication in which the customer's weight indicia borne by the chart are visible through a bezel 14 located on the customer's side of the chart housing near one end of such housing.

Fig. V illustrates another type of customer weight indication where the customer's weight indicia borne by the chart are visible through a bezel 14a located on the customer's side of the chart housing but at the longitudinal center thereof instead of near one of its ends.

Fig. VI shows one form of chart assemblage embodying the invention which is adapted to be employed with the type of customer's weight indication shown in Fig. IV. This chart assemblage comprises a chart shaft 15 on which may be secured a pinion 16 driven by the load counterbalancing mechanism of the scale (not shown). A narrow cylindrical chart 17 carries a series of customer weight indicia 18 and is supported on the shaft 15 by means of a spider 19 (see also Fig. X). The remainder of the chart 12 is a longer merchant's weight and value indicating chart 20 which carries a series of merchant's weight indicia 21 and a plurality of peripherally extending parallel rows of amount indicia 22. The chart 20 is supported on the shaft 15 by means of at least two chart spiders 23 and 24, one of which is located at each end of the chart 20.

Each of the chart spiders 19 and 23 has a plurality of arcuate slots 25 (see Fig. IX) cut in its arms so that when the spiders are placed on the shaft 15 adjacent each other the slots overlap. Through each of the pairs of overlapping slots there may be inserted a positioning bolt 26 which can be loosened to permit the two charts to be rotated on the shaft 15 relative to each other and tightened to hold the charts in place thereon. (It is preferred that the chart spider 23 be secured to the shaft and the chart spider 19 be freely rotatable thereon and held in position only by the bolts 26, as shown in Fig. X).

Therefore, regardless of the relative position of the customer's and merchant's sighting lines (shown at "C" and "M" in the various figures) the charts may be rotated relative to each other correctly to position the zero indicia of each of the series 18 and 21 with respect to the other and to the "sighting lines."

Fig. XI illustrates a similar construction but of a chart adapted to be employed with the customer's weight indicating means located as shown in Fig. V. In this construction the merchant's chart is divided into two cylinders 27 and 28 and the customer's chart is located therebetween. Each of the merchant's charts 27 and 28 is supported on the shaft 15 by a pair of supporting spiders. The merchant's weight indicia, as shown in Fig. VII, is on the chart 27 and the customer's weight indicia-bearing chart 17a is secured thereto. As can be seen in Fig. XI a customer's chart spider 19a, a merchant's chart spider 23a and a merchant's chart spider 24a are located at the center of the chart adjacent each other. The two spiders 19a and 23a are constructed as shown in Fig. IX and the two charts supported thereby are rotatable on the shaft being secured in the proper positions with respect to each other by a plurality of positioning bolts.

The embodiment of the invention illustrated in Fig. VIII comprises a merchant's chart 29 which extends the full length of the shaft 15 and which has an annular depression 30 around its periphery in line with a customer's weight indicating means of the type illustrated in Fig. V. A customer's weight indicia chart 17b, which is made in the shape of a long strip, lies in the annular depression 30. A plurality of slots 31 are cut through the chart 29, extending longitudinally the full width of the annular depression 30, and being spaced around the circumference of the chart in various positions. Depending upon the relationship between the customer's weight indicating chart 17b and the merchant's chart 29 which it is desired to establish, the two ends of the chart 17b are inserted through one of the slots 31 and crimped over inside the chart 29 to hold the chart 17b in place within the annular depression 30.

In all of the modifications of the invention illustrated the various relative positions between the customer's and merchant's charts may all be provided for by the use of a single customer's chart and a single merchant's chart (all of them being constructed according to the modification of the invention employed). Therefore, regardless of the type or style of cylinder scale which is being manufactured the two charts can be assembled therein in the proper relationship to afford correct indications from both sides of the scale in accordance with the desired relationship between the "sighting lines" of the merchant and of the customer.

The embodiments of the invention which have been disclosed may be modified to meet various requirements.

Having described my invention, I claim:

1. A substantially cylindrical chart for use in any of a series of generally cylindrical chart housings for weighing scales for use on counters, each of said housings being provided with customer's and merchant's indica viewing openings disposed at various relative positions to accommodate differences in counter elevation, said chart comprising a merchant's indicia bearing portion carried on spiders from a shaft rotatable in response to loads being weighed and a customer's indicia bearing portion carried on a spider supported by and rotatably adjustable with respect to a spider of said merchant's indicia bearing portion of said chart, whereby said chart may be selectively conditioned for use in any one of said series of housings regardless of the angular disposition of the indicia viewing openings.

2. An indicia bearing chart for use in counter type weighing scales, each of the scales having housings in which merchant's and customer's indicia viewing windows are variously positioned according to the probable viewing angles of the observers, in combination, as index in the field of view of each window, said indexes being variously positioned with respect to each other according to the positions of the windows, and a cylindrical chart arrangeable within any one of the housings and rotatable in response to loads being weighed, the chart comprising a merchant's indicia bearing portion carried on spiders from a rotatable shaft driven by weighing mechanism, and a customer's indicia bearing portion carried on an independent spider supported by and rotatably adjusted with respect to one of the spiders supporting the merchant's indicia bearing portion according to the spacing of the merchant's and customer's indexes to secure correspondence of indication.

3. An indicia bearing chart for use in counter type weighing scales, each of the scales having housings in which merchant's and customer's indicia viewing windows are variously positioned according to the probable viewing angles of the observers, in combination, an index in the field of view of each window, said indexes being variously positioned with respect to each other according to the positions of the windows, and a cylindrical chart arrangeable within any one of the housings and rotatable in response to loads being weighed, the chart comprising a main portion bearing merchant's indicia, which portion is carried on spiders mounted on a shaft rotatable in response to loads being weighed, and a minor portion bearing customer's indicia, which minor portion is carried by said major portion and is rotatably adjustable with respect thereto to position corresponding indicia in registration with their respective indexes.

HENRY KENDALL LEONARD.

REFERENCES CITED

The following references are of record in the file of this patent:

UNITED STATES PATENTS

| Number | Name | Date |
| --- | --- | --- |
| 2,063,715 | Wiley | Dec. 8, 1936 |
| 1,012,343 | Emanuel | Dec. 19, 1911 |
| 674,883 | Smith | May 28, 1901 |
| 1,411,357 | Hornbostel | Apr. 4, 1922 |
| 2,230,161 | Levkovitsch | Jan. 28, 1941 |